United States Patent
Tornabene et al.

(10) Patent No.: US 6,173,811 B1
(45) Date of Patent: Jan. 16, 2001

(54) COMBINATION HAND TRUCK, STEPLADDER AND BASKET CARRIER

(76) Inventors: Dean Tornabene, 4015 Glenco Ave., Marina Del Rey, CA (US) 90292; Charles Perez, 30 Brooks Ave., Venice, CA (US) 90291

(*) Notice: Under 35 U.S.C. 154(b), the term of this patent shall be extended for 0 days.

(21) Appl. No.: 09/320,749

(22) Filed: May 27, 1999

Related U.S. Application Data

(60) Provisional application No. 60/105,737, filed on Oct. 26, 1998.

(51) Int. Cl.[7] .................................................. E06C 1/00
(52) U.S. Cl. ................................. 182/20; 280/47.28
(58) Field of Search ................. 182/20, 21; 280/652, 280/47.18, 43.1, 43.14, 47.28, 47.21

(56) References Cited

U.S. PATENT DOCUMENTS

| | | |
|---|---|---|
| 2,363,619 * | 11/1944 | Prieto . |
| 2,680,027 * | 6/1954 | Puydt . |
| 3,751,058 | 8/1973 | Larson . |
| 4,175,761 | 11/1979 | Marshall . |
| 4,258,826 | 3/1981 | Murray . |
| 4,934,485 * | 6/1990 | Purkapile ........................ 182/20 |
| 5,277,436 | 1/1994 | Frank et al. . |
| 5,364,112 * | 11/1994 | Jackson . |
| 5,803,471 * | 9/1998 | De Mars . |
| 5,836,595 * | 11/1998 | Brice . |

FOREIGN PATENT DOCUMENTS

620310 * 3/1949 (GB) .................................. 182/106

* cited by examiner

Primary Examiner—Alvin Chin-Shue
(74) Attorney, Agent, or Firm—Howard A. Kenyon

(57) ABSTRACT

A hand truck, stepladder and basket carrier is disclosed. The combination is a portable and collapsible unit that converts into a hand truck having two wheels, a stepladder having the wheels raised and locked into place and a basket carrier attached to the hand truck. The basket is collapsed into the hand truck frame when not in use.

7 Claims, 4 Drawing Sheets

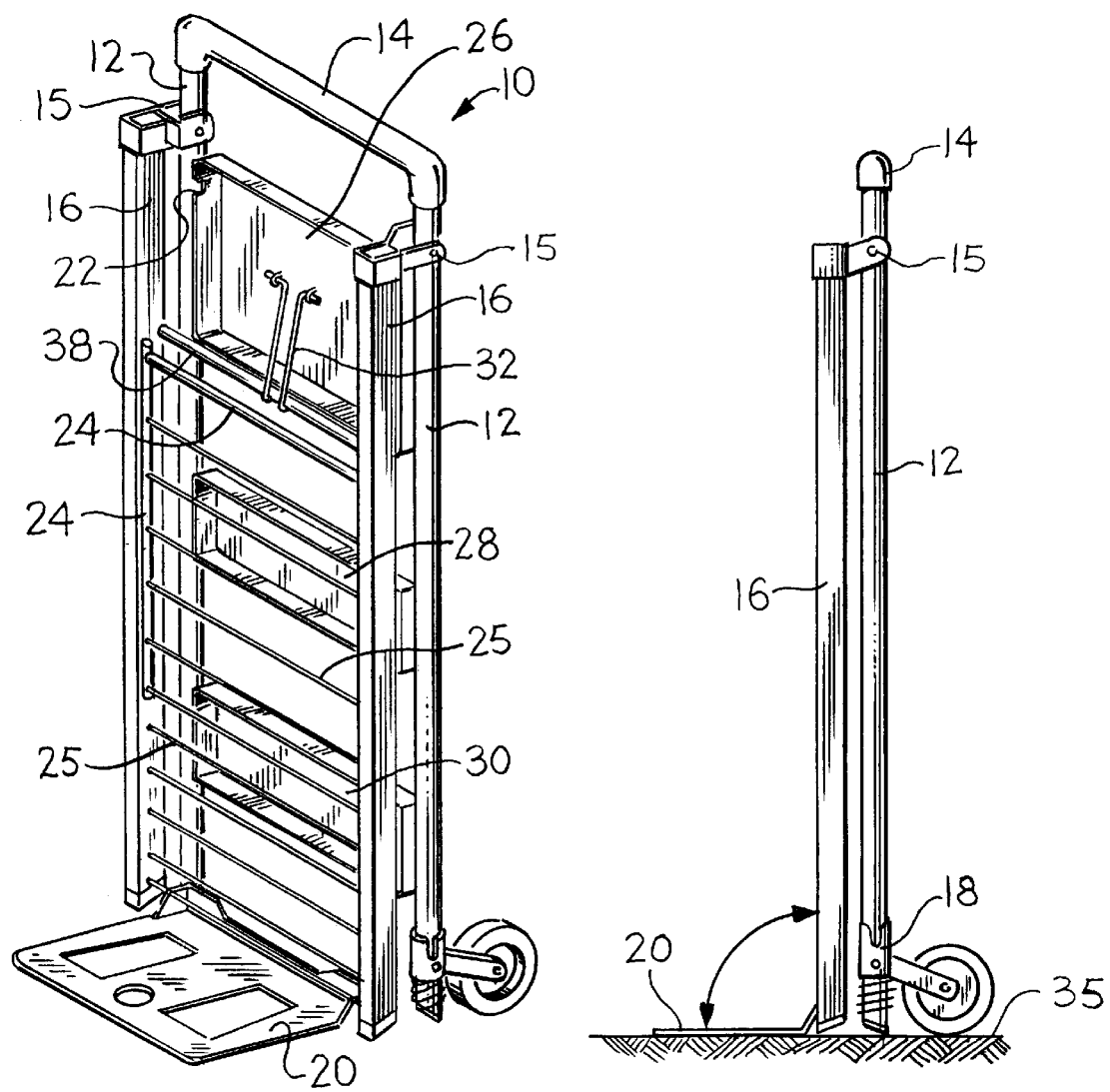

COMBINATION HAND TRUCK, STEPLADDER AND BASKET CARRIER

"The present application is a continuation-in-part of my co-pending Provisional Patent Application, Serial Number 60/105/737 filed Oct. 26, 1998 for Tri Utility Step Ladder" No new Matter has been added.

BACKGROUND OF THE INVENTION

1. Field of the Invention

This invention relates in general to a multi-use hand truck, and more specifically, the invention discloses how a hand truck can be converted into a stepladder or a basket carrier.

2. Description of the Prior Art

Various combination of lifting and moving devices have been known in the past.

U.S. Pat. No. 4,258,826 to Murray discloses a hand cart that can be converted to a stepladder and further disclosing a winch type that can raise a load to a higher level.

U.S. Pat. No. 4,494,626 to Ast discloses a hand truck that converts into a stepladder.

U.S. Pat. No. 3,751,058 to Larsen discloses a combination show shovel, wheel barrow and dolly.

U.S. Pat. No. 5,277,436 to Frank et al discloses a combination hand truck and stair climber.

U.S. Pat. No. 4,175,761 to Marshall shows a combination luggage carrier and cart.

What is needed is a combination hand cart, stepladder and basket carrier. None of the above patents describe the present invention.

SUMMARY OF THE INVENTION

It is the object of the present invention to provide a combination hand truck, stepladder and basket carrier, which is readily convertible from a hand truck into a stepladder or readily convertible from a hand truck into a basket carrier.

It is yet another object of the present invention to provide means for elevating the hand truck wheels above the supporting surface so that the stepladder will not move or slip.

It is still another object of the present invention to provide a pivotally mounted support plate member which normally carries a load when used as a hand truck but can be pivoted upward and locked in place to provide a compact structure for storage.

Another object of the present invention is to provide a basket that sits on the support plate when in use but can be collapsed toward the frame of the hand truck and locked in place when not in use to provide a compact structure for storage.

Briefly, in accordance with the invention, there is provided a combination hand truck, stepladder and basket carrier. The stepladder can be converted easily from the hand truck configuration in that the support plate in the front of the hand truck that normally carries the load can be pivoted upward and locked into place. The hand truck wheels can be rotated and locked in place such that the wheels are above the supporting surface of the stepladder. When the stepladder sides are opened the steps rotate to a horizontal position. The top step also rotates forward and is fastened to the opposite leg of the stepladder to provide holding means such that the two legs of the stepladder will only open to a given amount. The hand truck configuration can be converted to a basket carrier configuration by releasing the lock on the basket frame which when unfolded will sit on top of the hand truck plate to provide support to any load that is placed into the basket.

The foregoing summary of the invention outlines some of the more pertinent objects of the invention. The objects should be construed to be merely illustrative of some of the more prominent features of the intended invention. Many other beneficial results can be obtained by applying the disclosed invention in a different manner or modifying the invention within the scope of the disclosure. The summary outlines rather broadly more pertinent and important features of the present invention in order that the detailed description that follows may be better understood so that the present contribution to the art can be more fully appreciated.

Additional features of the invention will be described hereinafter which form the subject of the Claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended Claims.

DESCRIPTION OF THE DRAWINGS

1. FIG. 1 is a perspective view of the combination hand truck, stepladder and basket carrier in the hand truck usage condition.

2. FIG. 2 is a left side view of the combination hand truck, stepladder and basket carrier in the hand truck usage condition, the right side being a mirror image.

Figures 3, 4:
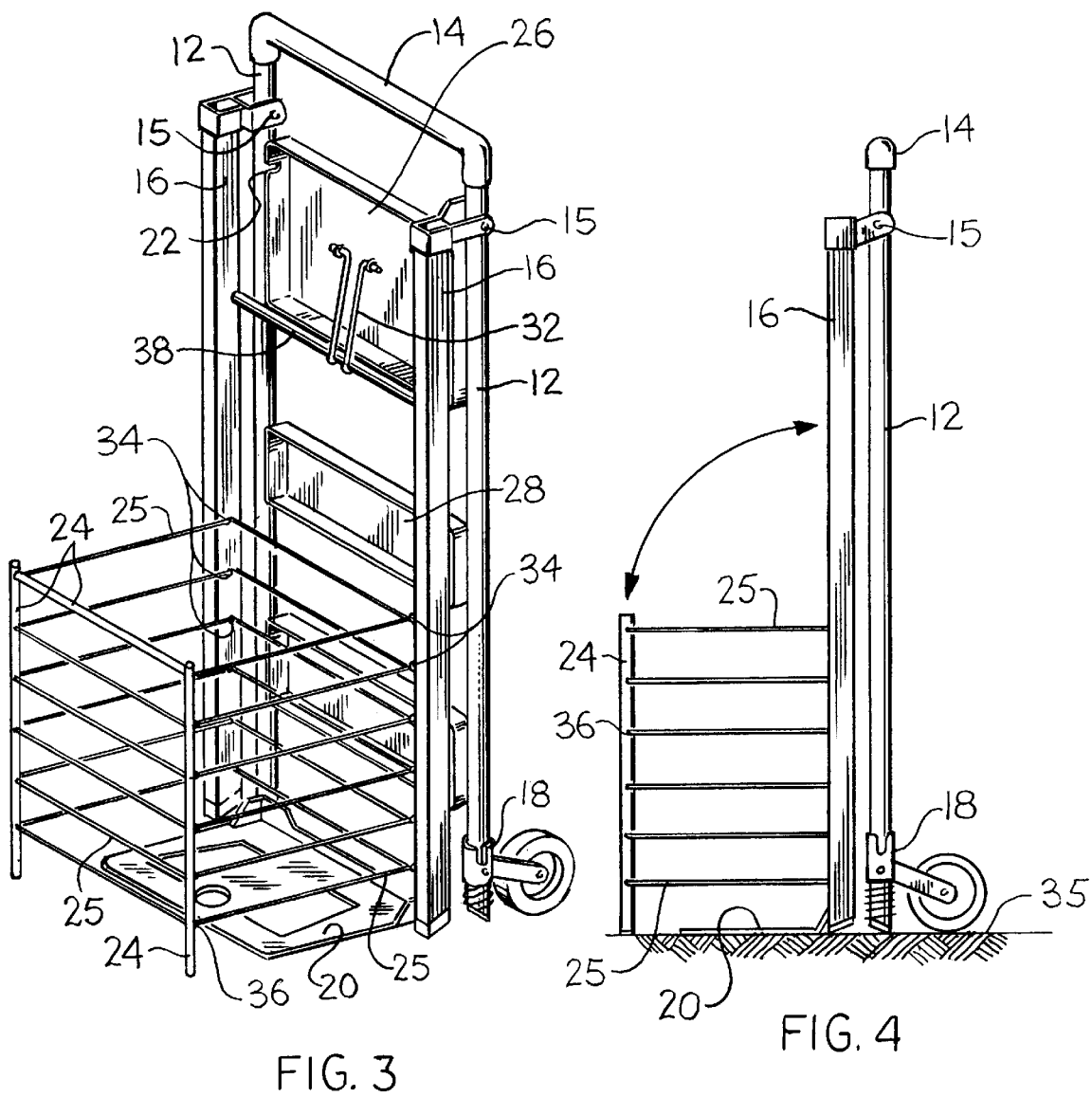
FIG. 3 is a perspective view of the combination hand truck, stepladder and basket carrier in the basket carrier usage condition.
FIG. 4 is a left side view of the combination hand truck, stepladder and basket carrier in the basket carrier usage condition, the right side being a mirror image.

These and other objects, features and advantages of the present invention will become more readily apparent upon detailed consideration of the following description of a preferred embodiment with references to the accompanying embodiment.

DESCRIPTION OF THE PREFERRED EMBODIMENT

Turning now to FIG. 1 there is seen a perspective view of the combination hand truck, stepladder and basket carrier apparatus in the hand truck usage condition generally shown as 10, which includes a stepladder support frame assembly 12, a connecting member 14 which also serves as a handle, a hand truck support frame assembly 16 which is pivotally connected to the stepladder support frame assembly 12, a wheel support assembly 18 which is connected to the lower portion of the stepladder support frame assembly 12, a support plate and locking assembly 20 which is pivotally connected to the lower portion of the hand truck assembly 16. Also seen in this view is a top step 26 and a notch 22 which together form a lock plate assembly which is part of the stepladder support frame assembly 12. This lock plate assembly which includes notch 22 is connected to the hand truck support frame assembly 16 by rod 38 to provide the inverted "I" shape in the stepladder usage condition. FIG. 1 also shows the basket assembly 24 and 25 folded into the hand truck support frame assembly 16. A locking mechanism which will be shown later holds the basket assembly in the folded position into the hand truck support frame assembly 16. The stepladder support frame assembly 12 includes a top step member 26 and lower step members 28 and 30. Also seen in this view is a connecting member 32 that provides a rotation of steps 26, 28 and 30 when the stepladder support frame assembly 12 and the hand truck assembly 16 is configured to the stepladder usage condition.

FIG. 2 is a left side view that shows the present invention in the hand truck usage condition. In this view there is seen the stepladder support frame assembly 12 and the hand truck support frame assembly 16. Connecting member 14 is also seen in this view. In the hand truck usage condition the wheel support assembly 18 has been rotated to provide a rolling member on the surface 35. Also seen in this view is the support plate and locking assembly 20 which is pivotally mounted to the bottom of the hand truck support frame assembly 16. The support plate and locking assembly 20 is in a down position for the hand truck usage condition.

FIG. 3 shows a perspective view of the present invention in the basket assembly usage condition. The basket assembly, which is made from heavy gage steel rod 24 and 25 pivots on the joints 35 that are pivotally fastened to the hand truck support frame assembly 16. The basket assembly also pivots on joints 36 whereby the folded basket assembly stays folded when there is a locking mechanism (not shown) in place which will be described later.

FIG. 4 is a left side view of the configuration as seen in FIG. 3 which is the basket assembly configuration. The right side being a mirror image.

Figure 5:
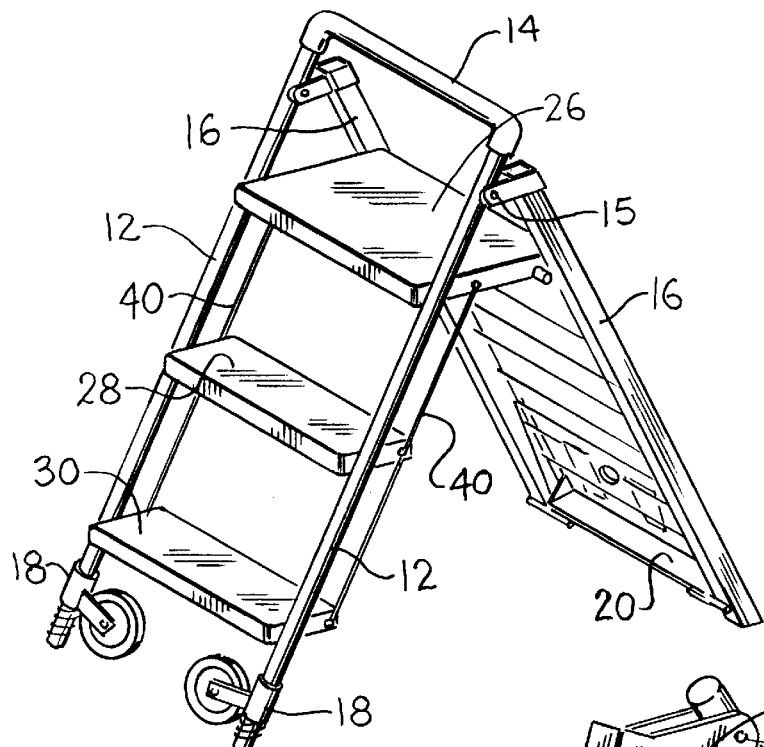
FIG. 5 is a perspective view of the combination hand truck, stepladder and basket carrier in the stepladder usage condition.

Turning now to FIG. 5 there is seen the present invention in the stepladder usage condition. As the hand truck frame assembly 16 and the stepladder support frame assembly 12 are spread apart and the two assemblies 12 and 16 pivot around pivot pin 15. As shown in FIG. 3, the connecting member 32 that is rotatably attached to rod 38 on one end and rotatably attached to the stop step 26 on the other end provides a rotation of top step 26 and simultaneously the rotation of steps 28 and 30 which are pivotally attached to the stepladder support frame 16 on both ends as seen on FIG. 5 Also on FIG. 5 a connecting rod 40 is pivotally attached to each step on both sides. When top step 26 rotates, subsequently steps 28 and 30 also rotate until top step 26 and steps 28 and 30 are parallel to the surface 35 as seen in FIGS. 2 and 4. The top step 26 also pivots around a pin (not shown) and is part of the lock plate assembly as seen in FIGS. 1 and 3. As top step 26 rotates, as seen in FIG. 3, notch 22 engages rod 38 to lock the hand truck support frame assembly 16 and the stepladder support frame assembly 12 in place. Also seen in FIG. 5 the wheel support assembly 18 has been rotated 90 degrees such that the wheels are no longer engaged with surface 35 as seen in FIGS. 2 and 4.

Figure 6:
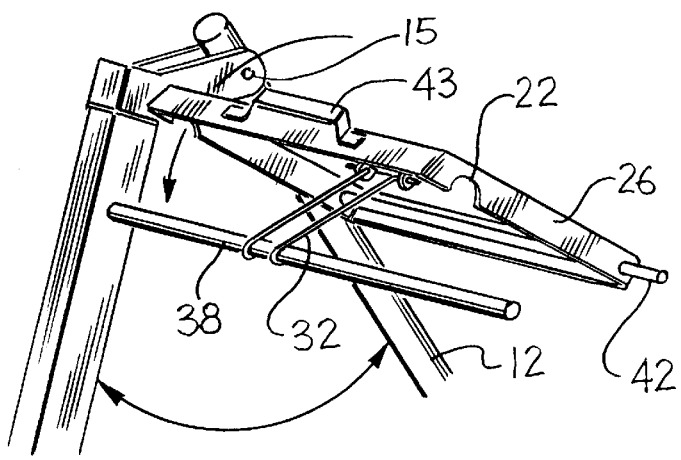
FIG. 6 is a cut-away perspective view of the combination hand truck, stepladder and basket carrier showing a support step assembly that is used to lock the stepladder members in the stepladder usage condition.

FIG. 6 provides a cut away view of the lock plate assembly. As the stepladder support frame assembly 12 and the hand truck support frame assembly 16 is moved apart and rotate around pin 15, the connecting member 32 that is rotatably attached to rod 38 on one end and rotatably attached to the center of the top step 26 on the other end provides the rotation of step 26 about rod 42 such that step 26 rotates until the notch 22 engages rod 38 and prevents the stepladder support frame assembly 12 and the hand truck support frame assembly 16 from moving further apart and provides a lock in the stepladder usage condition. Also seen is handle 43 to assist in folding the present invention from the stepladder usage condition.

Figure 7:
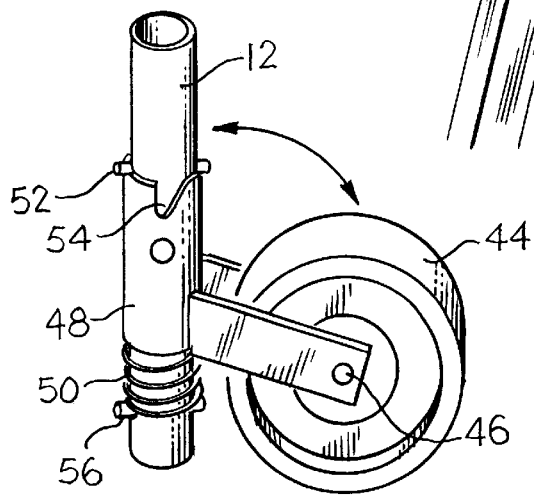
FIG. 7 is a detailed view of the wheel assembly of the combination hand truck, stepladder and basket carrier to show how the wheel can be placed in an elevated position.

FIG. 7 shows the details of the wheel support assembly 18. As seen in FIG. 7 the wheel support assembly 18 is in the hand truck usage condition as shown in FIGS. 1, 2, 3 and 4. Wheel 44 is sufficiently wide in order that the hand truck can be maneuvered over a soft surface easily. Wheel 44 rotates around axial 46 when moving on surface 35 as seen in FIGS. 2 and 4. The wheel support assembly 18 is fixed in a position by sleeve 48 being rotated and forced upward by spring 50 such that pin 52 fits into a notch (not shown) in sleeve 48. In order to obtain the wheel support assembly 18 in an elevated position for the stepladder usage condition, sleeve 48 is rotates 90 degrees such that spring 50 forces notch 54 upward whereby wheel 44 is above the surface where the stepladder is resting. It is noted that a pin 56 holds the spring 50 on members 12.

Figure 8:
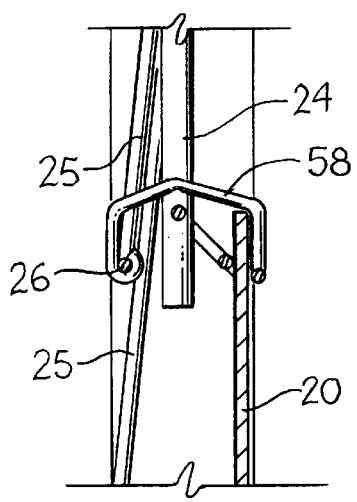
FIG. 8 is an isolated I view of a locking mechanism showing both the support plate assembly and the basket carrier locked in the up position.

Turning now to FIG. 8, there is seen a locking mechanism 58 to keep the support plate 20 and the basket carrier as seen by members 25 of the basket carrier in an up position. This locking mechanism is used when the combination hand truck, stepladder and basket carrier is in the stepladder usage condition. The locking mechanism 58 rotates about member 26 and captures the upper part of support plate 20 and basket carrier rods 25 in place.

Figure 9:
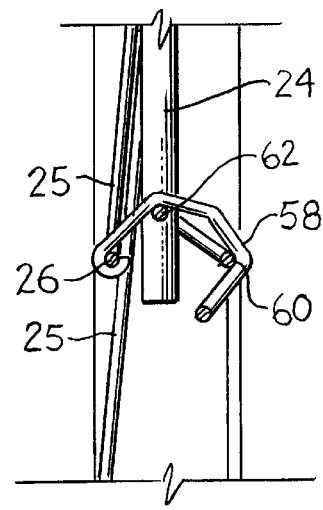
FIG. 9 is an isolated view of a locking mechanism showing only the basket carrier in the locked up position, the support plate assembly being in the down position.

FIG. 9 shows the same locking mechanism 58 such that locking mechanism 58 now captures rods 60 and 62 to hold the basket carrier represented by rods 25 in a locked position. The locking mechanism 58 as seen in FIG. 9, is used when the combination hand truck, stepladder and basket carrier is in the hand truck usage condition.

Figure 10:
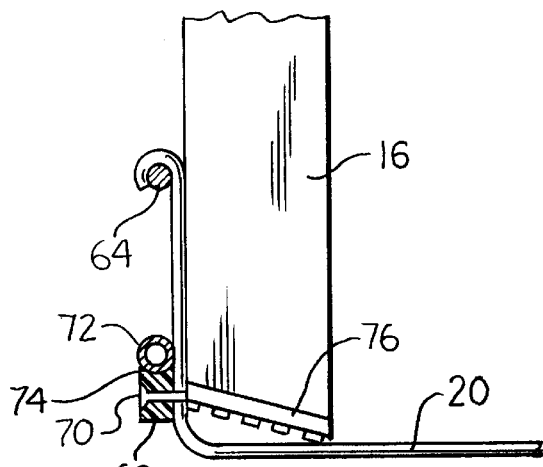
FIG. 10 is a detailed side view that shows the locking mechanism that holds the support plate assembly in a down position.
Figure 11:
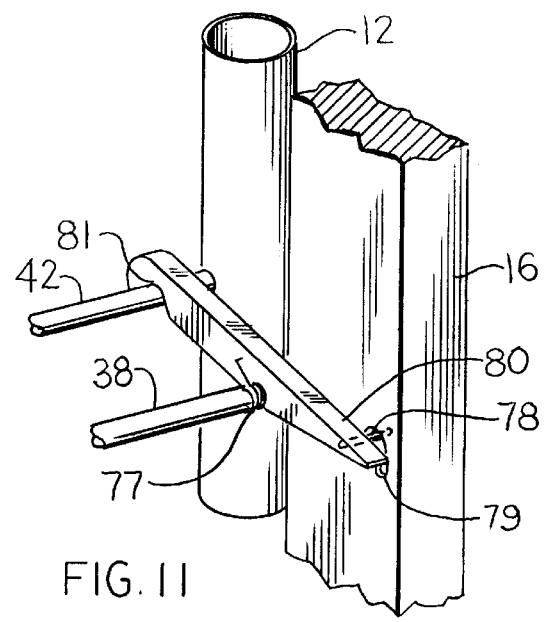
FIG. 11 is an isolated view of a latch mechanism that holds the hand truck support frame assembly and stepladder support frame assembly together in the storage condition.

FIG. 10 shows a locking mechanism to hold the support plate and locking assembly 20 in a down position. This mechanism detail is not shown in any of the previous drawings. The support plate 20 rotates around rod 64. A type of flexible plastic 68 is fastened to plate 20 by fastening means 70. A rod 72 is fixed to the hand truck support frame assembly 16. The top of the flexible plastic 68 has a "U" shaped groove 74 fixed thereon such that when support plate 20 is forced to the down position, rod 72 will fit into groove 74 and hold support plate 20 in the down position. Also seen in this figure is rubber anti-skid means 76 that attach to the bottom ends of the stepladder support frame assembly 12 and the hand truck support frame assembly 16. FIG. 11 shows a latching mechanism that holds the hand truck support frame assembly 16 and the stepladder support frame assembly 12 together when in the storage condition. As seen in FIG. 11 a latch 80 rotates around member 38. Pin 78 is fixed in member 80. Pin 78 rotates in slot 79 in the hand truck support frame assembly 16. Spring 77 is biased to hold pin 78 in the top of slot 79. When the hand truck support frame assembly and the stepladder support frame assembly are closed to be in the storage condition, member 80 is rotated around member 38 until the hand truck support frame assembly and the stepladder support frame assembly are closed. The notch 81 then fits over member 42, and when released, the spring 77 forces member 80 onto member 42 to hold the hand truck support frame assembly 16 and stepladder support frame assembly 12 together for the storage condition.

The present disclosure includes that contained in the appended claims, as well as the foregoing description. Although this description has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A combination hand truck, stepladder and basket carrier apparatus comprising:
   a stepladder support frame assembly having a support handle connected on one end of said stepladder support frame assembly;
   a wheel support assembly connected to the other end of said stepladder support frame assembly;
   a support step assembly pivotally connected to said stepladder support frame assembly;
   a hand truck support frame assembly having one end pivotally connected to said stepladder support frame assembly;
   a support and lock plate assembly having a support step pivotally mounted to said stepladder support frame assembly wherein said support and lock plate assembly when connected to said hand truck support frame assembly provides an inverted "V" shape in the stepladder usage condition;
   a support plate and locking assembly which is pivotally mounted to the lower end of said hand truck support frame assembly;
   a basket carrier assembly which is pivotally mounted to said hand truck support frame assembly whereby said support plate is either in an extended position or a retracted position, said support plate in the retracted position is held in the retracted position by latching means, said latching means also holds said basket carrier in a retracted position;
   a flexible stop that holds said support plate in an extended position; and
   said basket carrier being released by said latching means, said basket carrier extends into a rectangular configuration and said basket carrier rests on said support plate.

2. A combination hand truck, stepladder and basket carrier apparatus as described in claim 1, wherein said flexible stop is attached to the back of said support plated and is forced under a rod attached to said stepladder support frame assembly to lock the support plate in a down position.

3. A combination hand truck, stepladder and basket carrier apparatus as described in claim 1, wherein said support step assembly includes a top step member and a plurality of lower step members each pivotally mounted to said stepladder support frame assembly whereby each of said steps are connected by a rod on each end of said step members.

4. A combination hand truck, stepladder and basket carrier apparatus as described in claim 3, wherein said top step member which includes said support and lock plated assembly is rotated to latch said stepladder support frame assembly and said hand truck frame assembly together, whereby said rods connecting said step members provide the rotation of each of said step members to be parallel to a support surface of said hand truck, stepladder and basket carrier combination.

5. A combination hand truck, stepladder and basket carrier apparatus as described in claim 1, wherein said latching means are rods formed as a hook that can hold both the basket carrier assembly and support plate in the retracted position.

6. A combination hand truck, stepladder and basket carrier apparatus comprising:
   a stepladder support frame assembly having a support handle connected on one end of said stepladder support frame assembly;
   a wheel support assembly connected to the other end of said stepladder support frame assembly;
   a support step assembly pivotally connected to said stepladder support frame assembly;
   a hand truck support frame assembly having one end pivotally connected to said stepladder support frame assembly;
   a support and lock plate assembly having a support step pivotally mounted to said stepladder support frame assembly wherein said support and lock plate assembly when connected to said hand truck support frame assembly provides an inverted "V" shape in the stepladder usage condition;
   a support plate and locking assembly which is pivotally mounted to the lower end of said hand truck support frame assembly;
   a basket carrier assembly which is pivotally mounted to said hand truck support frame assembly; and
   said wheel support assembly is rotated against a spring with a cam, said cam lifting the wheel support assembly upward such that the wheel support assembly is no longer engageable with a support for surface supporting said hand truck, stepladder and basket carrier combination.

7. A combination hand truck, stepladder and basket carrier apparatus as described in claim 6, wherein said wheel support assembly is rotatable 90 degrees to eliminate contact with said surface when said hand truck, stepladder and basket carrier combination is in a stepladder usage condition.

\* \* \* \* \*